April 11, 1961 H. R. KARP 2,979,596
WINDSHIELD TEMPERATURE CONTROLLER
Filed July 27, 1949
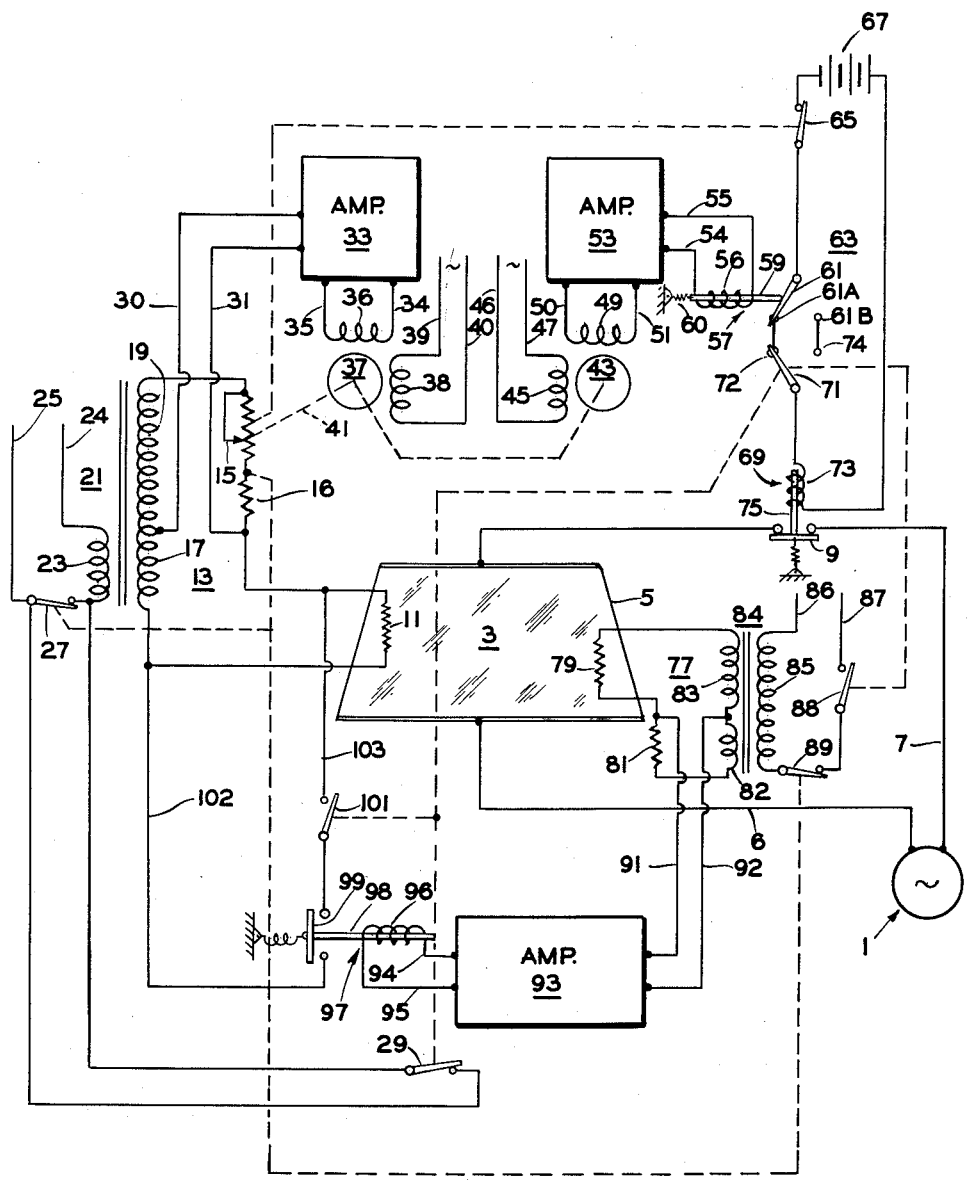
INVENTOR.
HARRY R. KARP
BY
ATTORNEY

United States Patent Office 2,979,596
Patented Apr. 11, 1961

2,979,596

WINDSHIELD TEMPERATURE CONTROLLER

Harry R. Karp, Newark, N.J., assignor to The Bendix Corporation, a corporation of Delaware Filed July 27, 1949, Ser. No. 107,023

2 Claims. (Cl. 219—20)

The present invention relates to a novel windshield heater control and more particularly to a windshield heater control in which the rate of change is limited.

In present day aircraft it is important to provide some means for keeping the windshields clear of ice and fog. This is usually accomplished by the application of heat to raise the temperature of the windshield. One method of applying heat is to embed a heating element in the windshield and connect the element across a suitable source of electrical energy, usually an alternator driven by the aircraft engine. It is necessary, however, that the temperature of the windshield be limited to some maximum value in order to avoid physical damage to the windshield and surrounding equipment and that the time rate of change of temperature whether being heated or cooled, must be limited to some predetermined value to avoid thermal shock.

The present invention is directed to a novel windshield temperature controller in which the temperature is limited to a predetermined maximum temperature, and that the time rate of change of temperature, whether being heated or cooled, is limited to a predetermined value yet requiring only an "on-off" switch for operation.

An object of the invention is to provide a novel system for controlling the application of heat to the windshield of an aircraft to effect the removal and prevention of the accumulation of ice thereon.

Another object is to provide novel means for controlling the application of heat to the windshield of an aircraft that will limit the rate of change of temperature whether being heated or cooled.

Another object is to provide novel means for controlling the application of heat to a windshield that will limit the temperature thereof to a predetermined maximum.

Another object is to provide novel means for controlling the application of heat to a windshield which will function merely by operating an "on-off" switch.

The above and other objects and features of the invention will appear more fully hereinafter from a consideration of the following description taken in connection with the accompanying drawings wherein one embodiment of the invention is illustrated by way of example.

In the drawing the single figure is a schematic diagram of a control system for a windshield heater embodying the invention.

Referring now to the single figure of the drawing, there is indicated by the numeral 1, an alternator of suitable type and which may be driven by an aircraft engine as a source of power for a heating element 3 embodied in a windshield 5. The heating element 3 may be a transparent electrical conductive coating applied to the windshield of a type such as sold under the tradenames NESA and Electra-Pane. The heater 3 is connected to the output of the alternator 1 by means of conductors 6 and 7, the conductor 7 is controlled by a switch 9, the operation of which will be explained later.

A temperature sensing element 11 is embedded in the windshield 5 and comprises a resistance having a high temperature coefficient, such as tungsten and will have a value proportional to the temperature of the windshield. The element 11 may be of such a type as shown and described in copending application Serial No. 68,594, filed December 31, 1948 by Joel D. Peterson, and now U.S. Patent No. 2,806,118, granted September 10, 1957, and assigned to Bendix Aviation Corporation.

The element 11 forms one arm of an alternating current excited bridge 13, a rheostat 15 and a fixed resistance 16 serves as another leg of the bridge 13. The remaining legs are provided by windings 17 and 19 forming secondary windings of a transformer 21. The bridge circuit 13 is energized with alternating current by means of primary winding 23 of the transformer 21 inductively coupled to the secondary windings 17 and 19. The winding 23 is connected to a suitable source of alternating current by conductors 24 and 25. The conductor 25 is controlled by switches 27 and 29, the operation of which will be explained later. The signal developed in the bridge 13 is dependent upon the difference in value between the element 11 and resistances 15 and 16 and will be of a direction or phase, depending upon whether the resistance of the element 11 is above or below that of the resistances 15 and 16. The output of the bridge 13 is connected by conductors 30 and 31 to the input of a phase-sensitive detector and amplifier 33.

The output of the amplifier 33 is connected by conductors 34 and 35 to one phase winding 36 of a reversible motor 37, which may be of the two-phase type, the other phase winding 38 being connected by conductors 39 and 40 across a source of alternating current for operation of the motor 37 in a manner well known in the art. The output shaft 41 of the motor 37 is mechanically connected to the variable arm of the rheostat 15. When the resistance of the element 11 equals the resistance of the elements 15 and 16 no signal will be developed in the output of the bridge 13. However, when the resistances are unequal a signal will be developed and amplified by the amplifier 33 to drive the motor 37 in a direction to balance the bridge 13. If the temperature of the windshield 5 is changing fast, the speed of the motor 37 will be high, and conversely if the change is slow, the speed of the motor 37 will be low.

By attaching a tachometer generator 43 through suitable gears to the output shaft 41 of the motor 37 a signal will be developed that is a function of the time rate of change of the element 11. The generator 43 has an excitation winding 45 connected by conductors 46 and 47 across a suitable source of alternating current and a signal winding 49 the output voltage of which is proportional to the speed of the generator 43 is connected by conductors 50 and 51 to the input of an amplifier rectifier 53. The output of the amplifier rectifier 53 is connected by conductors 54 and 55 to winding 56 of relay 57. The relay winding 56 is energized by the output of the amplifier 53 only when the input signal from the generator 43 is above a predetermined value which corresponds to a predetermined rate of change in the temperature of the windshield 5. The relay 57 has an armature 59 biased by a spring 60 to the position shown and arranged to actuate a two position switch 61 in a control circuit 63. The switch 61 is normally in engagement with contact 61a and when the relay 57 is energized the switch 61 is actuated into engagement with contact 61b.

The control circuit 63 comprises the switch 61 in series with a limit switch 65, a source of electrical energy, which for purposes of illustration, is shown as a battery 67, a relay winding 69 and a two position "on-off" switch 71 connected in the order named. An "on" contact 72 of switch 71 is connected to the contact 61a of the switch 61 and an "off" contact 74 of the switch 71 is connected to the contact 61b. The switch 65 is normally closed and is disposed to be actuated by the movable arm of the rheostat 15 when it reaches a position corresponding to the predetermined maximum temperature of the windshield 5.

The winding 69 of relay 73 when energized causes armature 75 to actuate the normally open switch 9 to its closed position to connect the heater element 3 to the source of energy 1.

When the switch 71 is in the "off" position the motor 37 will drive the rheostat 15 towards a minimum position as the temperature of the windshield decreases. In order to insure that the rheostat 15 is returned to its minimum position at the end of the cooling period the element 11 is short-circuited to unbalance the bridge 13 in a direction to drive the rheostat 15 to its minimum position by an auxiliary bridge circuit 77. The bridge circuit 77 has a temperature sensing element 79 embedded in the windshield 5 and comprises a resistance having a high temperature coefficient similar to the element 11 as one arm. A temperature sensitive resistance 81 forms another arm. The resistance 81 is located to partake of the ambient temperature surrounding the windshield. The other arms of the bridge 77 are formed by windings 82 and 83 of a transformer 84. The bridge circuit 77 is energized with alternating current by means of primary winding 85 of the transformer 84 inductively coupled to the secondary windings 82 and 83. The winding 85 is connected to a suitable source of alternating current by conductors 86 and 87. The conductor 87 is controlled by a switch 88, which is mechanically interconnected with the switch 71 so as to be in a closed position when the switch 71 is in the "off" position and to be in an open position as shown when the switch 71 is in the "on" position, and a limit switch 89 which is normally closed and is actuated to an open position through a mechanical connection upon the movable arm of the rheostat 15 reaching its minimum position.

The output of the bridge 77 is connected by conductors 91 and 92 to the input of amplifier 93. The amplifier 93 is biased to have an output signal only when the difference in value between the elements 79 and 81 is below a predetermined amount, for example, below the value equivalent to 10° F. The output of the amplifier is connected by conductors 94 and 95 to winding 96 of relay 97. The relay 97 has an armature 98 arranged to actuate a normally open switch 99 to a closed position when the relay 97 is energized. The switch 99 in series with a switch 101 and conductors 102 and 103 are connected across the element 11. The switch 101 is mechanically interconnected with the switch 71 so as to be in a closed position when the switch 71 is in the "off" position and in an open position when the switch 71 is in the "on" position as shown.

In operation when the pilot determines that heat will be needed at the windshield 5, he may manually actuate the switch 71 to the "on" position. The switch 29 is mechanically interconnected with the switch 71 and is actuated to its closed position shorting out the switch 27 and energizing the transformer 21. Mechanical interconnection between the several switches is indicated by dotted lines. The switch 71 energizes the relay 73 to close the switch 9 to energize the heater 3. As the windshield heats up the value of resistance of the element 11 increases causing an unbalance in the bridge 13 producing an output signal which after amplification drives the motor 37 to rotate the movable arm of the rheostat 15 to balance the bridge 13. As the arm of rheostat 15 leaves its minimum position, the limit switches 27 and 89 return to their respective closed positions as shown. In the process of reaching the predetermined temperature if the rate of change be excessive, the tachometer generator 43 will produce a signal voltage sufficient to energize relay 57 to actuate the switch 61 to the 61b contact thereby opening the control circuit 63 to de-energize the relay 75 shutting off the electrical energy to the heater 3. With the energy shut off the rate of change will drop below the predetermined rate and the relay 57 will become de-energized and the switch 61 under force of spring 60 will return to engage the 61a contact.

When the windshield reaches the predetermined maximum temperature the movable arm of the rheostat 15 through its mechanical interconnection will actuate the switch 65 to open the control circuit 63 thereby shutting off the power. Upon cooling below the predetermined maximum the arm of the rheostat 15 will be actuated to decrease the value of resistance of the rheostat 15 thereby permitting the switch 65 to return to a closed position to again energize the control circuit 63.

To shut off the system, the switch 71 is actuated to its "off" position. This also opens through its mechanical interconnection the switch 29 and closes the switches 88 and 101. Closing the switch 88 energizes the auxiliary bridge circuit 77. In the "off" position switch 71 opens the control circuit 63 which permits the switch 9 to open removing the power from the heater 3. However, if the rate of cooling exceeds the predetermined maximum, the generator 43 will produce an output signal sufficient to energize relay 57 to actuate the switch 61 into engagement with the 61b contact. Inasmuch as the 61b contact and the "off" contact 74 are connected together the control circuit 63 will be completed and the switch 9 actuated to a closed position. Upon the rate of cooling falling below the predetermined maximum the relay 57 will become de-energized and the control circuit 63 opened shutting off the power.

As the windshield cools down the temperature of the windshield will approach the ambient temperature. The amplifier 93 is biased so as to have an output signal only when the resistance of element 79 is reduced to a predetermined value over the resistance of element 81, for example when the value corresponds to 10° F. The output signal of the amplifier 93 energizes the relay 97 to actuate the switch 99 to a closed position thereby shorting out the element 11. This causes an unbalance in the bridge 13 in a direction to cause the rheostat 15 to be driven to its minimum position where it will actuate through suitable mechanical interconnection the switches 27 and 89 thereby de-energizing the system. By having the fixed resistance 16 in connection with the rheostat 15, the direction of unbalance when the element 11 is short-circuited, will always be in the direction to drive the rheostat to its minimum position.

Thus the overall system will therefore provide temperature control and temperature rate control by means of a two position "on-off" switch, making a simple operation for the pilot to control the application of heat to the windshield.

Although only one embodiment of the invention has been illustrated and described, various changes in the form and relative arrangements of the parts may be made to suit requirements.

What is claimed is:

1. In a control system for regulating the temperature of a transparent panel having a heater element energized from a source of electrical energy, a bridge circuit energized from a source of electrical energy, and a resistor element having a high temperature coefficient of resistance connected in one leg of said bridge circuit and disposed to partake of the temperature of said panel; the improvement comprising a variable resistance connected in another leg of said bridge circuit, motor means responsive to the output of said bridge circuit to vary said variable resistance to balance said bridge, generator means driven by said motor means at a rate proportional to the rate of variation, means operatively connected to said generator means for altering the supply of electrical energy to said heater element from said first mentioned source when said rate exceeds a predetermined maximum, first switch means actuated by said motor means for disconnecting said first mentioned source of electrical energy from said heater element when said variable resistance reaches a predetermined maximum value, and second switch means actuated by said motor means for disconnecting said second mentioned source of electrical energy from said bridge circuit when said variable resistance reaches a predetermined minimum value, and other manually operable switch means to shunt said second switch means.

2. In a system for controlling the application of heat to a transparent panel having a resistor heating element associated therewith, in combination, a source of electrical energy, normally open relay means for connecting said source to said heating element, a control circuit for energizing said relay means including an "on-off" switch, a bridge circuit having an input and an output, a resistor element having a high temperature coefficient of resistance connected in one leg of said bridge circuit and disposed to partake of the temperature of said panel, a rheostat connected in another leg of said bridge circuit, means responsive to the output of said bridge circuit to drive said rheostat in a direction to balance said bridge at a rate proportional to the unbalance, means responsive to said rate to affect said control circuit so as to de-energize said relay means when said switch is in the "on" position and to energize said relay means when said switch is in the "off" position, means responsive to a predetermined maximum temperature of said panel to de-energize said relay means, a second bridge circuit having an input and output, a resistor element having a high temperature coefficient of resistance connected in one leg of said second bridge circuit and disposed to partake of the temperature of said panel, a second resistor element having a high temperature coefficient of resistance connected in another leg of said bridge and disposed to partake of the ambient temperature surrounding said panel, means responsive to said output of said second bridge circuit when said switch is in said "off" position to drive said rheostat to a predetermined minimum position when said output reaches a predetermined minimum thereby to de-energize said system.

References Cited in the file of this patent

UNITED STATES PATENTS

| | | |
|---|---|---|
| 1,942,587 | Whitman | Jan. 9, 1934 |
| 2,082,109 | Hunt | June 1, 1937 |
| 2,105,598 | Hubbard | Jan. 18, 1938 |
| 2,113,436 | Williams | Apr. 5, 1938 |
| 2,236,624 | Littwin | Apr. 1, 1941 |
| 2,319,406 | Jones | May 18, 1943 |
| 2,352,619 | Garr | July 4, 1944 |
| 2,368,701 | Borden | Feb. 6, 1945 |
| 2,375,988 | Gille et al. | May 15, 1945 |
| 2,413,128 | Wills | Dec. 24, 1946 |
| 2,423,541 | Wilson et al. | July 8, 1947 |
| 2,462,207 | Mershon | Feb. 22, 1949 |
| 2,600,313 | Mershon | June 10, 1952 |
| 2,608,635 | Mershon | Aug. 26, 1952 |
| 2,616,018 | Karp et al. | Oct. 28, 1952 |
| 2,616,019 | Guillot et al. | Oct. 28, 1952 |